United States Patent [19]

Agarwal

[11] Patent Number: 5,070,365
[45] Date of Patent: Dec. 3, 1991

[54] LOW LATERAL FORCE DRIVE ROLLER SYSTEM

[75] Inventor: Vinod K. Agarwal, Webster, N.Y.
[73] Assignee: Xerox Corporation, Stamford, Conn.
[21] Appl. No.: 630,573
[22] Filed: Dec. 20, 1990
[51] Int. Cl.$^5$ .......................................... G03G 15/00
[52] U.S. Cl. .................. 355/212; 29/895.21; 29/121.4; 198/843; 474/189
[58] Field of Search ............... 355/212; 474/187-192; 29/895.21, 895.211, 895.23, 527.2, 527.4, 121.4, 132; 198/806, 840, 843

[56] References Cited

U.S. PATENT DOCUMENTS

| | | | |
|---|---|---|---|
| 1,660,538 | 9/1924 | Whitney | 29/895.21 |
| 3,273,696 | 9/1966 | Thurston | 198/202 |
| 3,713,348 | 1/1973 | Conrad et al. | 74/240 |
| 3,859,865 | 1/1975 | Conrad | 74/241 |
| 3,972,414 | 8/1976 | Conrad | 198/202 |
| 4,140,216 | 2/1979 | Conrad | 198/835 |
| 4,221,480 | 9/1980 | Spehrley, Jr. | 355/212 |
| 4,832,186 | 5/1989 | Conrad | 198/840 |

Primary Examiner—Joan H. Pendegrass
Attorney, Agent, or Firm—William A. Henry, II

[57] ABSTRACT

A apparatus in which lateral movement of a moving belt is controlled so that the belt moves in a predetermined path. The apparatus includes dual oppositely wound, helical springs having a rectangular cross-section with a high friction material extruded thereon. The springs are mounted on a shaft with an adhesive.

9 Claims, 3 Drawing Sheets

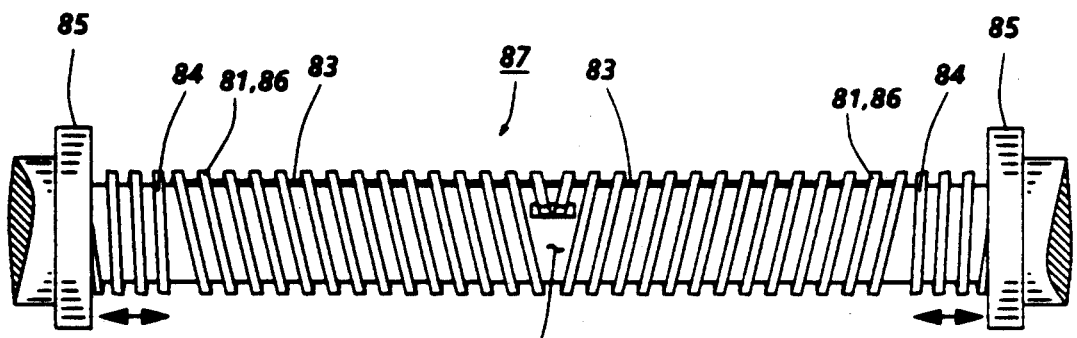
FIG. 4
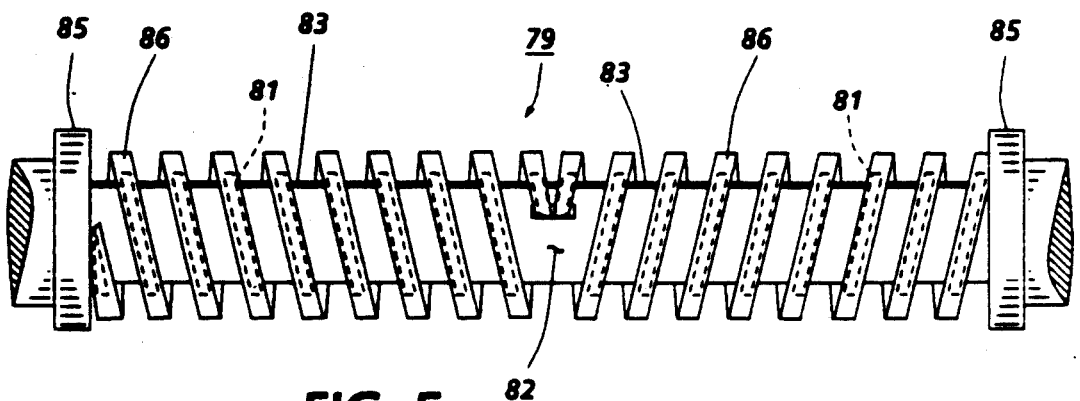
FIG. 5a
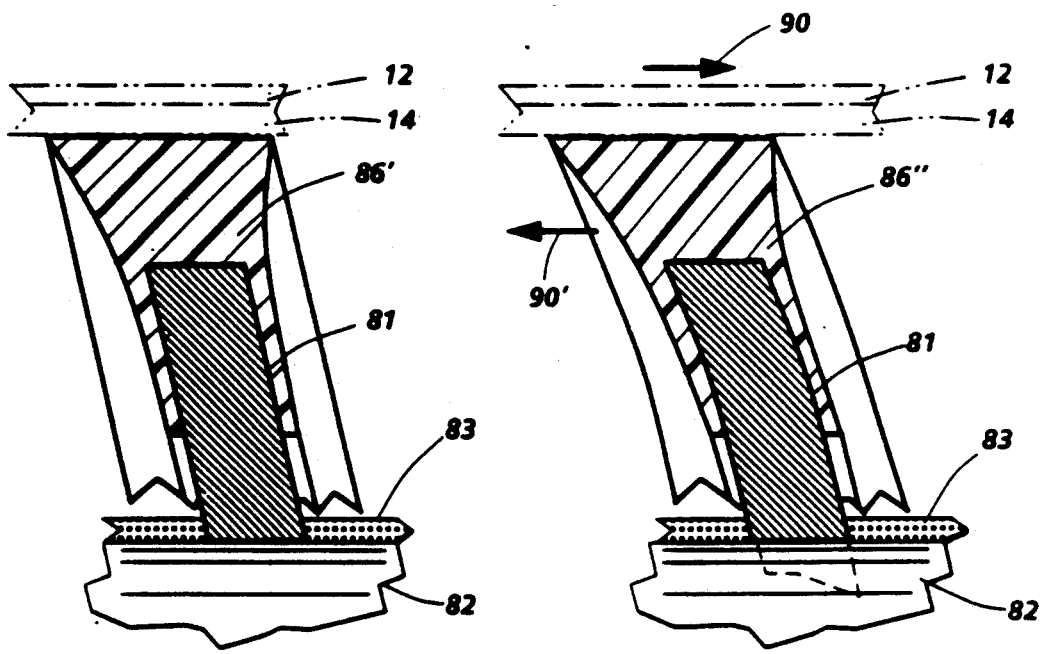
FIG. 5b   FIG. 5c

LOW LATERAL FORCE DRIVE ROLLER SYSTEM

This invention relates generally to an apparatus for supporting a belt arranged to move in a predetermined path and for controllering lateral movement of the belt from the predetermined path. An apparatus of this type is frequently employed in an electrophotographic printing machine where it is necessary to control the lateral movement of the belt to closely prescribed tolerances.

Generally, an electrophotographic printing machine includes a photoconductive member which is charged to a substantially uniform potential so as to sensitize its surface. The charged portion of the photoconductive surface is exposed to a light image of an original document being reproduced. This records an electrostatic latent image on the photoconductive member corresponding to the informational areas contained in the original document being reproduced. After the electrostatic latent image is recorded on the photoconductive member, the latent image is developed by bringing a developer mix of carrier granules and toner particles into contact therewith. The toner particles are attracted from carrier granules to the latent image forming a toner powder image on the photoconductive member. The toner powder image is then transferred from the photoconductive member to a copy sheet. Finally, the copy sheet is heated to permanently affix the toner particles thereto in image-wise configuration. The location of the latent image recorded on the photoconductor must be precisely defined in order to have the various processing stations acting thereon optimize copy quality. Therefore, it is critical that the lateral alignment of the photoconductive belt be controllered within prescribed tolerances. Only in this manner will the photoconductive belt move through a predetermined path so that the processing stations disposed thereabouts will be located precisely relative to the latent image recorded thereon.

When considering control of the lateral movement of the belt, it is well known that if the belt were constructed perfectly and entrained about perfectly cylindrical rollers mounted and secured in an exactly parallel relationship with one another, there would be no lateral movement of the belt. In actuality though, this is not feasible because of the manufacturing process and assembly process frequently the belt is not completely cylindrical or the rollers are tilted relative to the plane defined by the moving belt or both. On the art of these circumstances, the belt will move laterally relative to its intended position until it is in a kinematically stable position.

One method of supporting a belt and controllering its lateral movement is disclosed in U.S. Pat. No. 4,221,480 which includes a plurality of spaced, flexible discs extending outwardly from the exterior surface of a support member. Preventing the belt from deviating laterally from the predetermined path deflects the portion of the segments of the disc providing support for the belt. The deflector portion of the disc returns to the undeflected condition when not supporting the belt laterally. In this manner, maximum force applied to the belt never exceeds the minimum force required to buckle the belt. One problem with steering mechanisms of this type is that manufacturing the discs require molding and precision grinding or cutting of discs with water jets. Both methods involve several steps which translate into expense, although the latter technique has been shown to have reduced the cost somewhat. Nevertheless, their widespread use, particularly in low volume products, has been stymied by their high unit cost. Especially for products where the rollers and the belts they support are treated as disposable units and are thrown away after a predetermined number of copies are made.

Another technique for tracking and aligning belts is shown in U.S. Pat. No. 3,713,348 in which tubular cylindrical members have oppositely wound spirally tending ribbing on the outer peripheries on opposite sides of a central depression. The ribbings are encased by a covering member that prevents the ribbing from coming into direct contact with the belt being supported. Also, the ribbings are positioned within recessed portions of their support member. The problem with this type of system is that the ribbing is not allowed to move laterally, thereby not possessing the tracking qualities that were provided by the lateral deflection in U.S. Pat. No. 4,221,480. On the other hand, the U.S. Pat. No. 4,221,480 does not provide the lateral force component which is produced by the helixes in U.S. Pat. No. 3,713,348.

Other prior art includes U.S. Pat. No. 3,859,865 which discloses a positive centering roller which has spiraled ribbing for guiding and centering a woven wire conveyor. In U.S. Pat. No. 4,832,186, a conveyor tracking roller is disclosed having helical guides of variable pitch machined into the cylindrical surface of the roller. The varying pitch allows for quick centering of underlying belts.

A track roller having V-shaped helical grooves is shown in U.S. Pat. No. 4,140,216. U.S. Pat. No. 3,972,414 discloses a self-centering idler roller for conveyor belting. Spirally tending ribbing is on middle and side rollers to correct for lateral shifting of the belting. Angled side rollers aid in centering extreme cases of lateral offset. A belt positioning device for controlling lateral position of a traveling belt is shown in U.S. Pat. No. 3,273,696, that includes a shaft which support roller members and bearing elements. All of the above-mentioned references are incorporated herein by reference to the extent necessary to practice the present invention. Obviously, with the cost and complexity of the above-mentioned devices, the need is still current for a low-cost method and apparatus for steering belts toward a predetermined center line.

Accordingly, a low lateral force roller is disclosed having helixes of opposite pitch on each side of the roller for endless belt tracking. The roller includes the use of two rectangular cross-section, helical springs of opposite pitch having a friction material coating only on partial outer surface portions thereof and mounted on a shaft. The springs are set on the shaft with a desired pitch pattern and retained by an adhesive.

Other features of the present invention will become apparent as the following description proceeds and upon reference to the drawings, in which.

Figure 2:
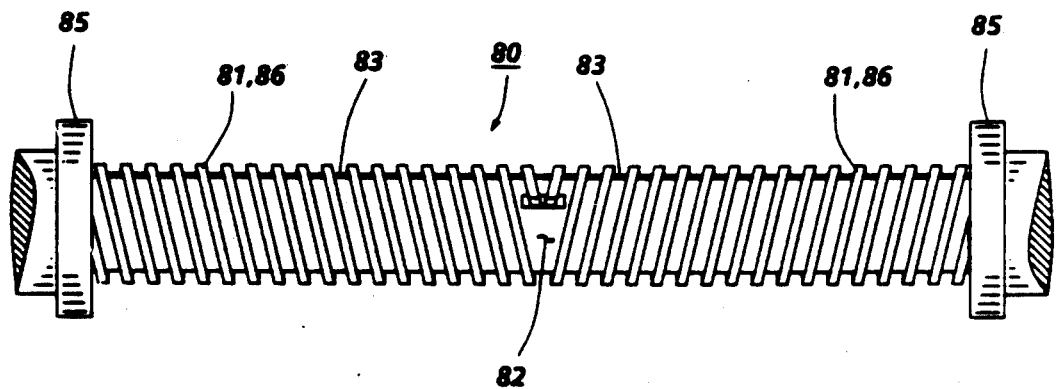
FIG. 2 is an enlarged elevational view of a representative low lateral force roller used in the FIG. 1 printing machine.

FIG. 4 is an enlarged elevational view of an alternative low lateral force roller that incorporates freely rotatable springs opposite end guides that are journaled to a shaft; and FIGS. 5a, 5b and 5c show an enlarged elevational view of yet another alternative embodiment of the low lateral force roller of the present invention including a spring member having a different pitch from the spring member in FIG. 2 with a tapered coating on the spring that is deflected in FIG. 5c.

While the present invention will hereinafter be described in connection with the preferred embodiment thereof, it will be understood that this not intended to limit the invention to that embodiment. On the contrary, it is intended to cover all alternatives, modifications and equivalents as may be included within the spirit and scope of the invention as defined by the appended claims.

Figure 1:
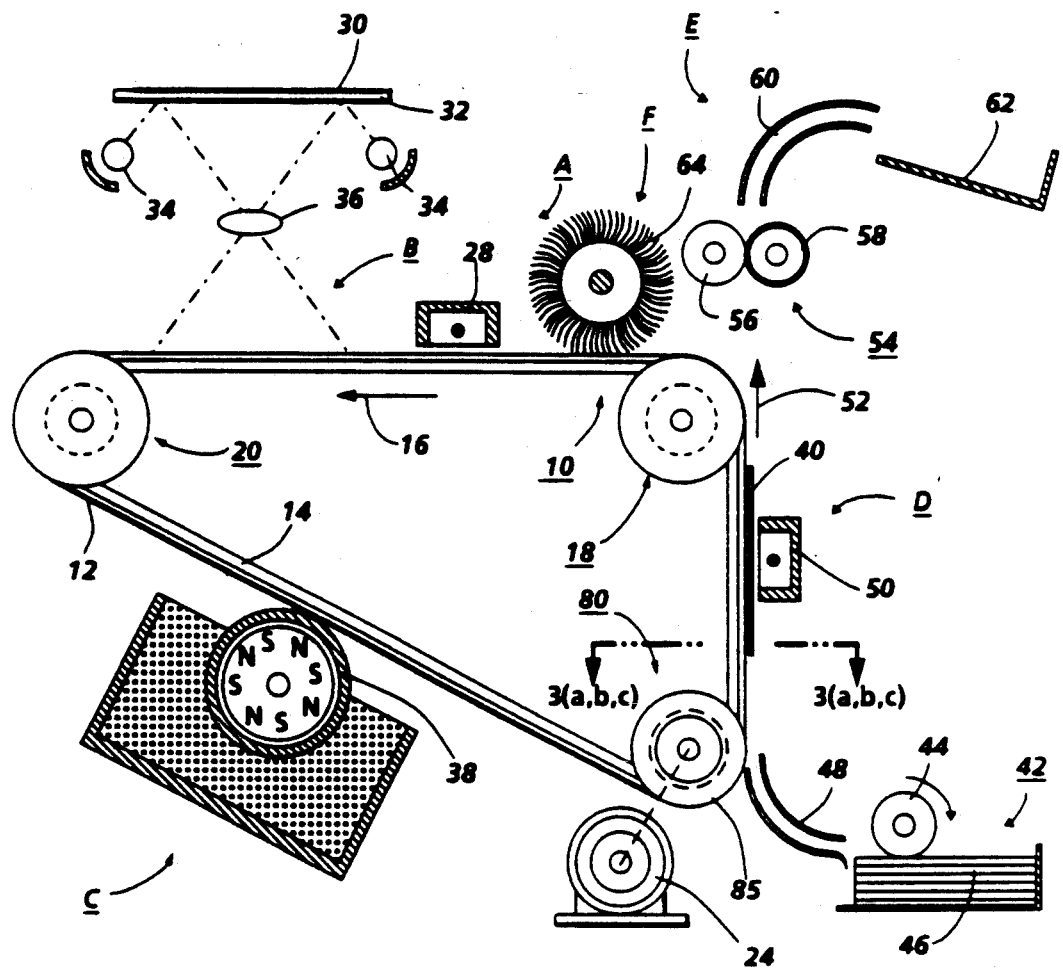
FIG. 1 is a schematic elevational view depicting an electrophotographic printing machine incorporating the elements of a preferred embodiment of the present invention therein.

For a general understanding of the features of the present invention, reference is made to the drawings. In the drawings, like reference numerals have been used throughout to designate identical elements. FIG. 1 schematically depicts the various components of an illustrative electrophotographic printing machine incorporating the low cost, low lateral force drive roller and control apparatus of the present invention. It will become evident from the following discussion that the low lateral force drive roller of the present invention is equally well suited for a use in a wide variety of devices and is not necessarily limited in its application to the particular embodiments shown herein. For example, the apparatus of the present invention may readily be employed in magnetic tape systems, ocean picture cameras, and motion picture projectors, among others.

Inasmuch as the art of electrophotographic printing is well known, the various processing stations employed in the FIG. 1 printing machine will be shown hereinafter schematically and their operation described briefly with reference thereto.

As shown in FIG. 1, the electrophotographic printing machine employs a belt 10 having a photoconductive surface 12 deposited on a conductive substrate 14. Preferably, photoconductive surface 12 is made from a selenium alloy with conductive substrate 14 being made from an aluminum alloy. However, an organic photoconductive surface could be used if desired. Belt 10 moves in the direction of arrow 16 to advance successive portions of photoconductive surface 12 sequentially through the various processing stations disposed about the path of movement thereof. Belt 10 is entrained about stripping roller 18, tension roller 20, and drive roller 80. The structure of these rollers will be described in detail hereinafter with reference to FIGS. 3a, 3b and 3c.

Drive roller 80 is mounted rotatably and in engagement with belt 10. Motor 24 rotates roller 80 to advance belt 10 in the direction of arrow 16. Roller 80 is coupled to motor 24 by suitable means such as a belt drive. Drive roller 80 includes a pair of opposed, spaced flanges or edge guides 85. Edge guides 85 are mounted on opposed ends of drive roller 80 defining a space therebetween which determines the desired predetermined path or movement for belt 10. Edge guides 85 extend in an upwardly direction from the surface of roller 80. Preferably, edge guides 85 are circular members or flanges.

Belt 10 is maintained in tension by a pair of springs (not shown) resiliently urging tension roller 20 against belt 10 with the desired spring force. Both stripping roller 18 and tension roller 20 are mounted rotatably. These rollers are idlers which rotate freely as belt 10 moves in the direction of arrow 16.

With continued reference to FIG. 1, initially a portion of belt 10 passes through charging station A. At charging station A, a corona generating device, indicated generally by the reference numeral 28, charges photoconductive surface 12 of belt 10 to a relatively high, substantially uniform potential.

Next, the charged portion of photoconductive surface 12 is advanced through exposure station B. At exposure station B, an original document 30 is positioned face down upon transparent platen 32. Lamps 34 flash light rays onto original document 30. The light rays reflected from original document 30 are transmitted through lens 36 forming a light image thereof. The light image is projected onto the charged portion of photoconductive surface 12 to selectively dissipate the charge thereon. This records an electrostatic latent image on photoconductive surface 12 which corresponds to the informational area contained within original document 30.

Thereafter, belt 10 advances the electrostatic latent image recorded on photoconductive surface 12 to development station C. At development station C, a magnetic brush developer roller 38 advances a developer mix into contact with the electrostatic latent image. The latent image attracts the toner particles from the carrier granules forming a toner powder image photoconductive surface 12 of belt 10.

Belt 10 then advances the toner powder image to transfer station D. At transfer station D, a sheet of support material 40 is moved into contact with the toner powder image. The sheet of support material is advanced to transfer station D by a sheet feeding apparatus 42. Preferably, sheet feeding apparatus 42 includes a feed roller 44 contacting the upper sheet of stack 46. Feed roller 44 rotates so as to advance the uppermost sheet from stack 46 into chute 48. Chute 48 directs the advancing sheet of support material into contact with the photoconductive surface 12 of belt 10 in a timed sequence so that the toner powder image developed thereon contacts the advancing sheet of support material at transfer station D.

Transfer station D includes a corona generating device 50 which sprays ions onto the backside of sheet 40. This attracts the toner powder image from photoconductive surface 12 to sheet 40. After transfer, the sheet continues to move in the direction of arrow 52 onto a conveyor (not shown) which advances the sheet to fusing station E.

Fusing station E includes a fuser assembly, indicated generally by the reference numeral 54, which permanently affixes the transferred toner powder image to sheet 40. Preferably, fuser assembly 54 includes a heated fuser roller 56 and a back-up roller 58. Sheet 40 passes between fuser roller 56 and back-up roller 58 with the toner powder image contacting fuser roller 56. In this manner, the toner powder image is permanently affixed to sheet 40. After fusing, chute 60 guides the advancing sheet 40 to catch tray 62 for removal from the printing machine by the operator.

Invariably after the sheet of support material is separated from photoconductive surface 12 of belt 10, some residual particles remain adhering thereto. These residual particles are removed from photoconductive surface 12 at cleaning station F. Cleaning station F includes a rotatably mounted fibrous brush 64 in contact with photoconductive surface 12. The particles are cleaned from photoconductive surface 12 by the rotation of brush 64 in contact therewith. Subsequent to cleaning, a discharge lamp (not shown) floods photoconductive surface 12 with light to dissipate any residual electrostatic charge remaining thereon prior to the charging thereof for the next successive imaging cycle.

It is believed that the foregoing description is sufficient for purposes of the present application to illustrate the general operation of an electrophotographic printing machine.

Referring now to the specific subject matter of the present invention, FIG. 2 depicts low lateral force (LLF) drive roller 80 in greater detail. Generally, a LLF roller is similar to a standard drive roller which has an elastomer coating of a predetermined thickness that is sliced to form two oppositely pitch helixes attached or fixed to a shaft. The elastomer material normally has a high coefficient of friction. A roller of the standard type is different from the LLF roller 80 in FIG. 2 as evidenced by the axial performance of the two rollers. A prior art rubber LLF roller as in U.S. Pat. No. 4,221,480 behaves in operation like a flexible (elastic), disconnected discs which provides a lateral restoring force as a belt it is supporting tries to walk axially. The lateral force produced by the LLF roller 80 of FIG. 2 comes from three different sources: 1) the helixes, 2) the transverse deflection of the spring itself, as shown in FIGS. 5b and 5c, and 3) freely rotatable coils 84. In addition, low cost to manufacture can now be achieved, since the springs and coating of the springs are accomplished by using a conventional extrusion process.

Producing a high precision uniform diameter rubber roller and further manufacturing steps make significant contributions to the cost of the roller. For example, to avoid cutting helixes or discs in rubber with, e.g., high pressure water jets and therefore, the main cost, the LLF roller of the present invention starts with a very uniform helical spring of wire 81 which has a rectangular cross-section. A high friction material 86 is extruded onto the top surface as well as a portion of the sides of the spring 81. In the next step, the wire is cut into predetermined lengths and two springs 81 with opposite helixes are slid over a shaft 82 and retained thereon by a conventional adhesive 83. It should be understood that wires 81 could be coated with a high friction material after they have been cut to the length desired, if necessary, but this could be more costly. This procedure eliminates the heretofore used costly LLF roller manufacturing procedure of machining a high precision uniform diameter rubber roller and then cutting helixes or discs into the roller.

Figure 3A:
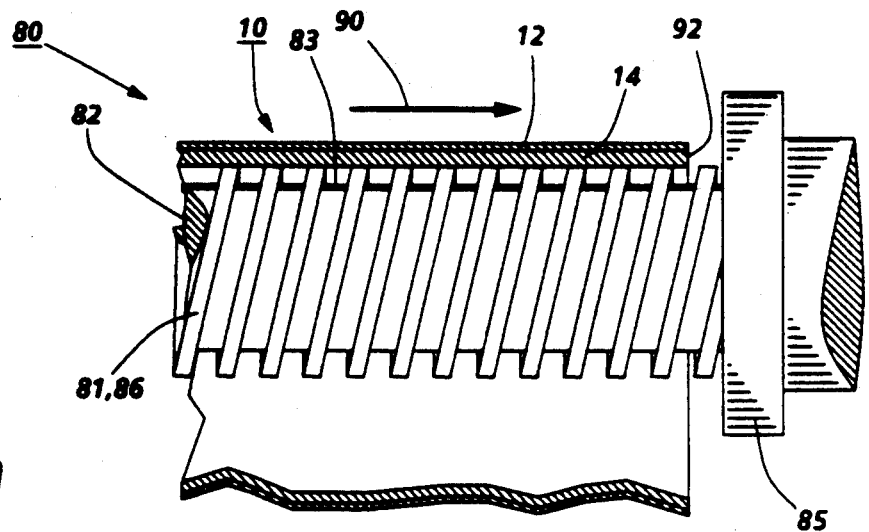
FIG. 3a is an enlarged fragmentary, schematic elevational view showing a belt moving laterally along the surface of a FIG. 2 low lateral force drive roller.
Figure 3B:
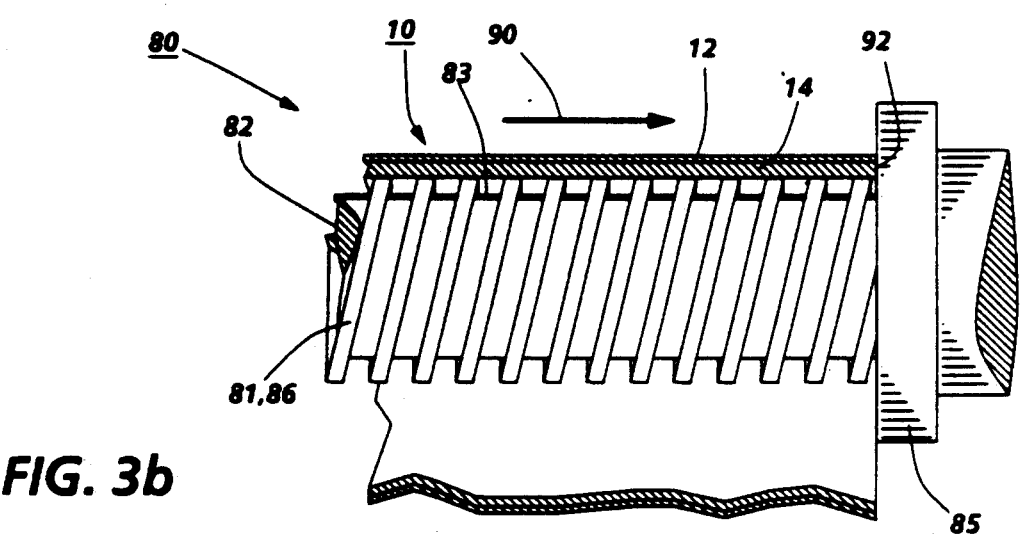
FIG. 3b is an enlarged, fragmentary schematic elevational view depicting the belt contacting an edge guide of the FIG. 2 low lateral force drive roller.
Figure 3C:
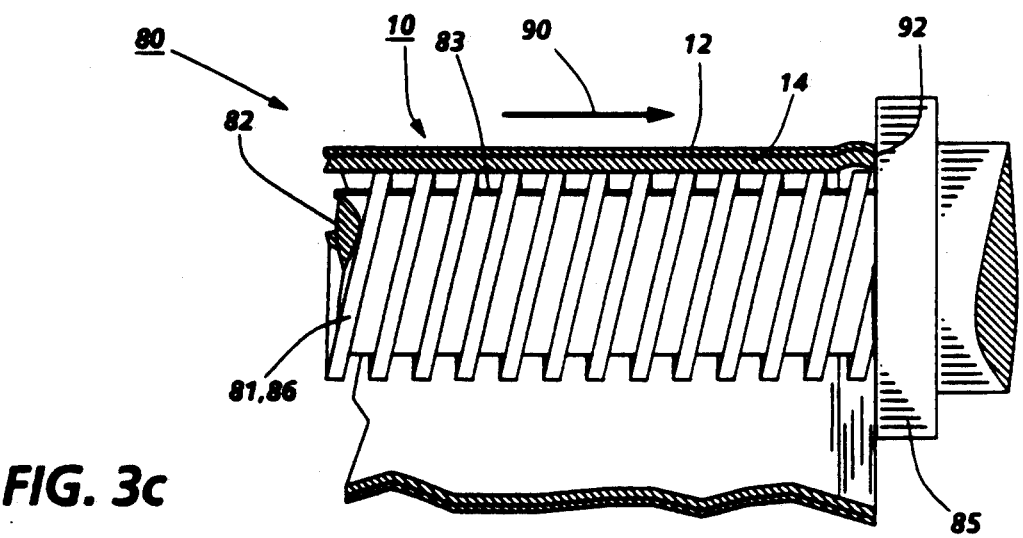
FIG. 3c is an enlarged, fragmentary schematic elevational view illustrating the FIG. 2 low lateral force drive roller deflected.

Referring now to FIGS. 3a-3c, inclusive, the manner which drive roller 80 prevents lateral movement of belt 10 will be described. While only the operation of drive roller 80 will be described, one skilled in the art will appreciate the tension roller 20 and stripping roller 18 operate in a substantially identical manner.

Turning now to FIG. 3a, belt 10 is shown moving laterally in the direction of arrow 90 across LLF drive roller 80. A portion of each oppositely wound spring 81 supports belt 10. Edge guide 85 defines the maximum permissible lateral movement of belt 10 in the direction of arrow 90. As belt 10 continues to move in the direction of arrow 90, belt edge 92 engages edge guide 85.

FIG. 3b shows edge 92 of belt 10 contacting edge guide 85. Belt 10 is wrapped around spring 81. The circumferential portion of spring 81 contacting belt 10 is determined by the length of belt wrapped around roller 80, i.e., the wrap angle. As shown, portions of spring 81 support belt 10 at an angle predetermined in accordance with specifics of the belt to be controlled with a space between portions of the spring. The spring is mounted on and adhered to shaft 82.

Now turning to FIG. 3c, as belt 10 continues to move in the direction of arrow 90, a bend forms in the side marginal region of the belt. As belt 10 bends at 92, portions of spring 81 closely adjacent side guide 85 deflect or bend from their original position. As drive roller 80 continues to rotate, portions of belt 10 move away from spring 81, and portions of spring 81 that were originally in a non-supporting position of belt 10, move into contact therewith.

An alternative embodiment 87 of the present invention is shown in FIG. 4 that incorporates friction material coated, freely rotatable springs 84 adjacent guides 85 in order to further aid springs 81 in the correction of the lateral motion of photoconductive belt 10. Springs or coils 84 are deflect axially toward edge guides 85 by lateral movement of the belt and return to their original position as indicated by the double ended arrows under the springs. There is flexibility in the placement of springs 84 on shaft 82 as long as symmetry of the springs is maintained with respect to the center of the shaft. The LLF roller 87 has springs of variable pitch that can be determined according to particular requirements for the belt that is to be controlled.

Another alternative embodiment of a LLF roller 79 of the present invention is shown in FIGS. 5a-5c, where 5a depicts springs 81 configured on shaft 82 at a helical angle different from the angle in FIG. 2. Also, covering material 86', which is extruded onto all springs in the figures, is shown with a tapered shape in FIGS. 5b and 5c. The tapered shaped side of coating 86' in FIG. 5b will allow more lateral movement of belt 10 than, for example, a thicker trapezoidal shaped coating. All coatings, in FIGS. 2-5c, have a flat top portion that is adjacent belt 10. Any shape of coating 86 could be used with the springs of this invention as long as the bending stiffness of the coating and base spring material is sufficient for the particular application. By controlling the shape of the coating, one can control the bending stiffness, and thus the lateral force. Coating 86' of FIG. 5b has been deflected laterally in the direction of arrow 90' of FIG. 5c due to belt 10 moving into side guide 85. Bending stiffness of spring 81 will cause the coating 86" to assume the position of 86' in FIG. 5b after the maximum extent of bending has occured.

Referring once again to FIG. 1, only drive roller 80 is shown as having edge guides 85. One skilled in the art will appreciate that stripping roller 18 and tension roller 20 may also have edge guides. This system will operate satisfactorily with one, two or three pairs of edge guides. The total edge force exerted on the belt will be substantially the same in any of the foregoing cases.

It is, therefore, evident that there has been provided for low volume paper handling applications where light torque and limited life is required, in accordance with the present invention, an apparatus and method for supporting a belt and controlling lateral movement thereof. This apparatus fully satisfies the aims and advantages here and before set forth. While this invention has been described in conjunction with a specific embodiment thereof, it is evident that many alternatives, modifications and variations would be apparent to those skilled in the art. Accordingly, it is intended to embrace all such alternatives, modifications and variations as fall within the spirit and scope of the appended claims.

What is claimed is:

1. An apparatus for supporting a belt arranged to move in a predetermined path and for controlling lateral movement of the belt from the predetermined path, comprising: at least one rotatably mounted roller that includes a shaft; and dual oppositely wound helical springs fixed to said shaft, and wherein said oppositely wound helical springs are separately and individually coated with a high friction material.

2. The apparatus of claim 1, wherein said oppositely wound, helical springs have a rectangular cross-section.

3. The apparatus of claim 1, wherein said high friction material covers only a portion of said springs.

4. The apparatus of claim 3, wherein said springs are attached to said shaft with an adhesive.

5. The apparatus of claim 1, including at least two springs positioned symmetrically on said shaft and adapted to be freely rotated by movement of said belt in the direction of said predetermined path.

6. The apparatus of claim 5, including guide means for guiding said belt in said predetermined direction at opposite ends of said shaft and non-fixed springs located on said shaft adjacent said guide means to aid in lateral movement of said belt.

7. An electrophotographic printing machine of the type having an endless photoconductive belt arranged to move in a predetermined path wherein the improved apparatus for supporting the photoconductive belt and controlling lateral movement of the photoconductive belt from the predetermined path includes: a shaft; dual oppositely wound helical springs fixed to said shaft; and wherein said oppositely wound helical springs are individually coated with a high friction material.

8. The apparatus of claim 7, wherein said oppositely wound, helical springs have a rectangular cross-section.

9. The apparatus of claim 8, including at least two springs positioned symmetrically on said shaft and adapted to be freely rotated by movement of said belt in said predetermined direction.

* * * * *